3,840,648
PROCESS FOR THE PRODUCTION OF CYANOGEN CHLORIDE

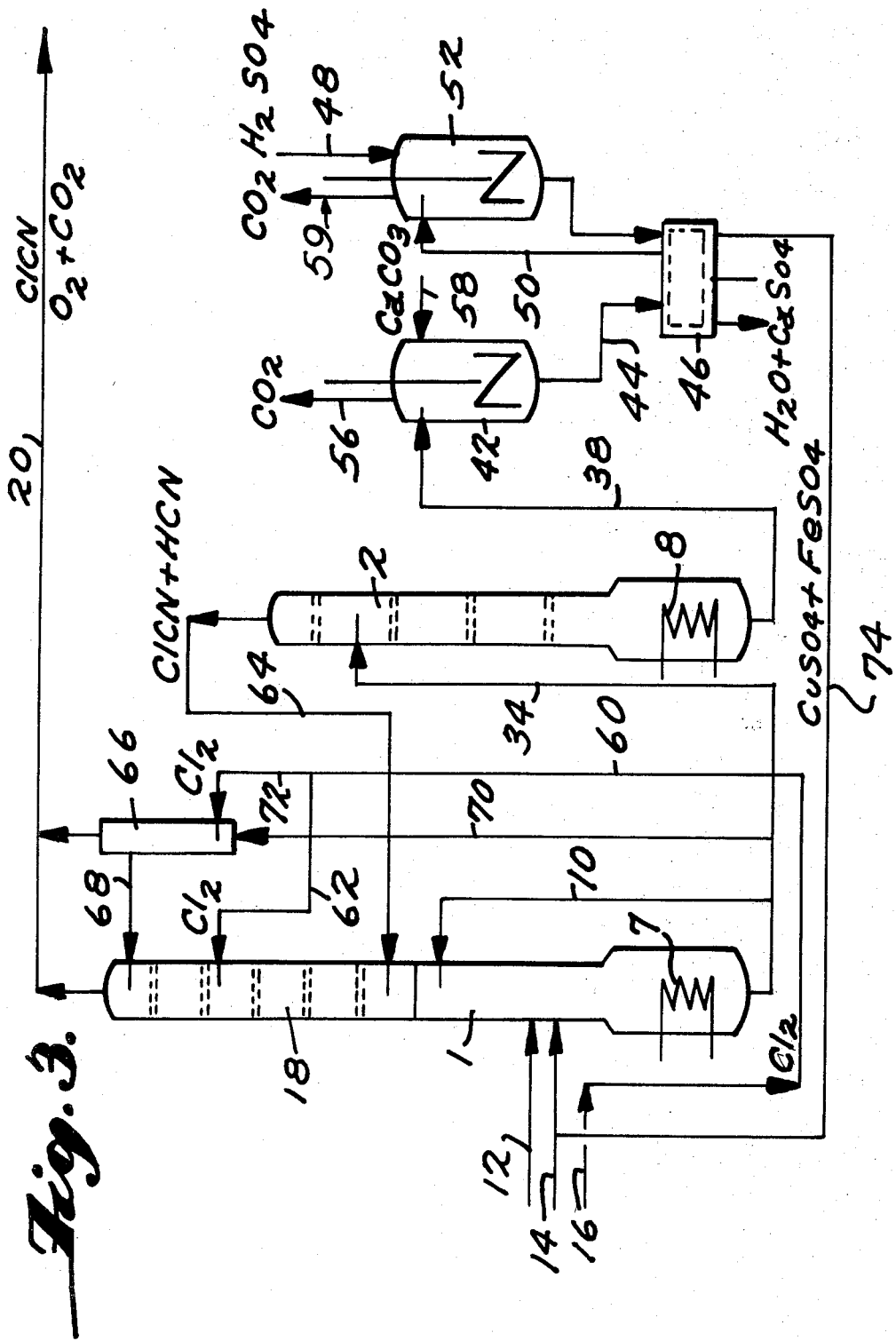

Johannes Heilos, Seligenstadt, Werner Heimberger, Hanau, Theodor Lussling, Grossauheim, and Wolfgang Weigert, Offenbach, Germany, assignors to Deutsche Gold- und Silber-Scheideanstalt vormals Roessler, Frankfurt am Main, Germany
Continuation-in-part of abandoned application Ser. No. 153,467, June 2, 1971. This application June 20, 1972, Ser. No. 264,455
Claims priority, application Germany, June 24, 1971, P 21 31 383.7
Int. Cl. C01b 21/00, 31/00; C01c 3/00
U.S. Cl. 423—383          20 Claims

ABSTRACT OF THE DISCLOSURE

Cyanogen chloride is prepared from hydrogen cyanide, hydrogen chloride and hydrogen peroxide in the presence of cupric salts, preferably also in the presence of ferric salts. Preferably the process is carried out continuously.

---

Figure 1:
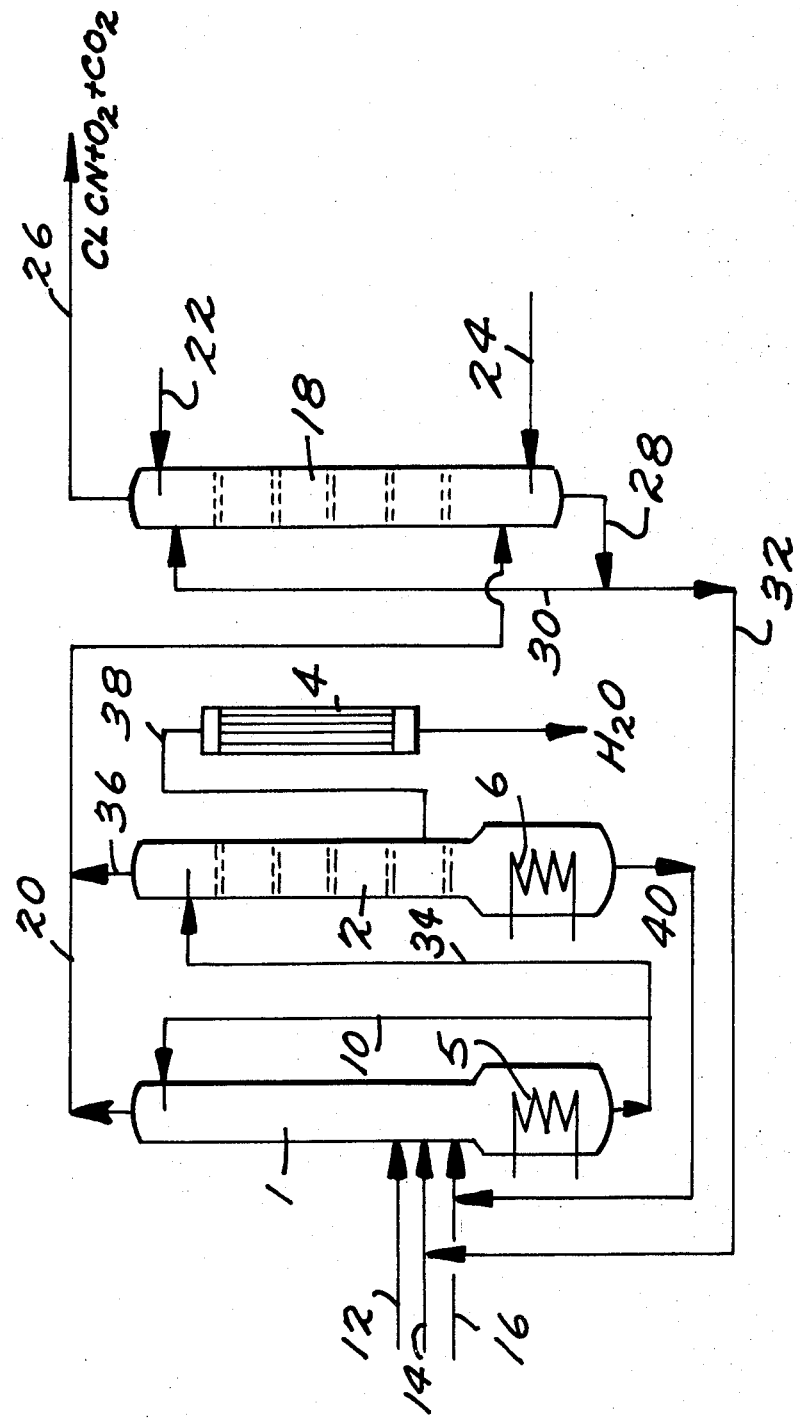

This application is a continuation-in-part of application 153,467 filed June 2, 1971, now abandoned.

It is known to produce cyanogen chloride from hydrogen cyanide and chlorine. The reaction can take place according to equation I $$HCN + Cl_2 \rightleftharpoons ClCN + HCl \qquad I$$

in the gas phase (Chem. Abst., Vol. 15,[1921], page 2593) or in aqueous solution (Heuser, U.S. Pat. 1,588,731 and German Pat. 827,358 and corresponding Huemer, U.S. Pat. 2,672,398). The hydrogen chloride formed in equimolar amounts is separated from the cyanogen chloride in various ways. For example, in working in aqueous phase, the separation of the hydrogen chloride as aqueous hydrochloric acid is relatively simple, since the cyanogen chloride is distilled therefrom as a gas. Similarly, the separation of the gaseous mixture takes place during the reaction in the gas phase by subsequent water washes.

The concentration of the aqueous solution of hydrogen chloride formed, however, in both cases can be permitted to reach at most 10 weight percent and the solution must be continuously hydroextracted to avoid saponification of the cyanogen chloride gas.

Another type of separation involves the selective dissolution of the cyanogen chloride from the resulting gas mixture in the working up of the gas phase. Here there is first removed the hydrogen chloride as a gas from the solution and subsequently follows the desorption of the cyanogen chloride at higher temperatures.

Although the last named method through the recovery of gaseous hydrogen chloride, which can then be further worked up, is more important than the other methods, it has the disadvantage that considerable disturbances can occur through the trimerization of the cyanogen chloride under the named conditions.

Entirely apart from the expense for the separation of the hydrogen chloride formed until now, a part of the reaction partners is always lost through formation of this by-product.

It has now been found that the reaction between chlorine and hydrogen cyanide can be so guided that cyanogen chloride is formed practically quantitatively if the chlorine is provided in situ to the hydrogen cyanide, namely by reaction of hydrogen chloride or aqueous hydrochloric acid and hydrogen peroxide in the presence of copper salts, in a given case with the additional presence of ferric salts. Preferably the reaction is carried out in continuous fashion.

In these processes there is no hydrogen chloride as by-product, but the applied hydrogen chloride or the applied hydrochloric acid is converted quantitatively to cyanogen chloride.

As aqueous hydrochloric acid solution there can be used solutions having a concentration from 3 weight percent to the constant boiling acid (36 weight percent), 10 weight percent hydrochloric acid also is very suitable. Furthermore, iron containing waste hydrochloric acid can be employed. As hydrogen cyanide, there can be used either the gaseous or liquid form, in a given case there can be used aqueous solutions of hydrogen cyanide such as the so-called waste acid from the production of acrylonitrile, for example. The hydrogen cyanide can be of 5 to 90 weight percent in the aqueous solution.

Hydrogen peroxide can be added as a 10–70 weight percent aqueous solution, preferably as a 35 weight percent solution.

The hydrogen chloride, hydrogen cyanide and hydrogen peroxide are used in equivalent amounts, i.e., in equimolar amounts. An excess of any of the reactants is not preferred. There can be used the following mole ratios:

| | Moles |
|---|---|
| Hydrogen chloride | 0.9 to 1.1 |
| Hydrogen cyanide | 0.9 to 1.0 |
| Hydrogen peroxide | 0.9 to 1.1 |

The in situ formation of the chlorine takes place in the presence of cupric salts, in a given case activated with ferric salts. As cupric salts there can be added for example cupric chloride, cupric bromide, cupric nitrate, cupric cyanide and cupric sulfate. As ferric salts there can be used the corresponding compounds such as ferric chloride, ferric bromide, ferric nitrate and ferric sulfate.

The cupric salts can be used in an amount of from 0.05 mole/liter of reaction solution up to the saturation point in the reaction solution. These proportions are also true for the ferric salts, i.e. 0.05 mole/l. of reaction solution to the saturation point. The total amount of the salts also lies in the range of 0.1 mole per liter of reaction solution up to their saturation in the reaction solution. Preferably cupric chloride and ferric chloride are used together, namely in a total amount of 0.5 mole/l. of reaction solution.

The reaction occurs most advantageously at temperatures of 15–65° C. and can even be from 0 to 100° C., although the temperature is not the essence of the invention. A temperature of 50° C. is preferred.

It is suitable to premix the aqueous catalyst solution of cupric salt in a given case together with the ferric salt, with a part of the hydrogen chloride and to introduce into this mixture the other reaction partners and the rest of the hydrogen chloride or the rest of the hydrochloric acid. Hydrogen cyanide preferably should only be introduced into the composition as it is consumed.

The process of the invention likewise is also useful to change the hydrochloric acid formed as a by-product in both of the former processes by reaction of hydrogen cyanide and chlorine into cyanogen chloride by addition of hydrogen peroxide in the presence of the cupric salt catalyst solution, after hydrochloric acid is formed in a given case also containing ferric salts. In this connection, the reaction partners chlorine and hydrogen cyanide likewise can also be added together from the beginning with the hydrogen peroxide and the aqueous cupric salt catalyst solution (with or without the ferric salt). In this case, the hydrogen peroxide does not react with the chlorine present but only with the hydrogen chloride formed during the reaction.

The speed of reaction is so great that no difficulties are encountered in an industrial carrying out of the process.

The yield of cyanogen chloride amounts to over 95% of theory on a throughput of 80% based on the hydrogen cyanide added.

Unless otherwise indicated, all parts and percentages are by weight.

Figure 2:
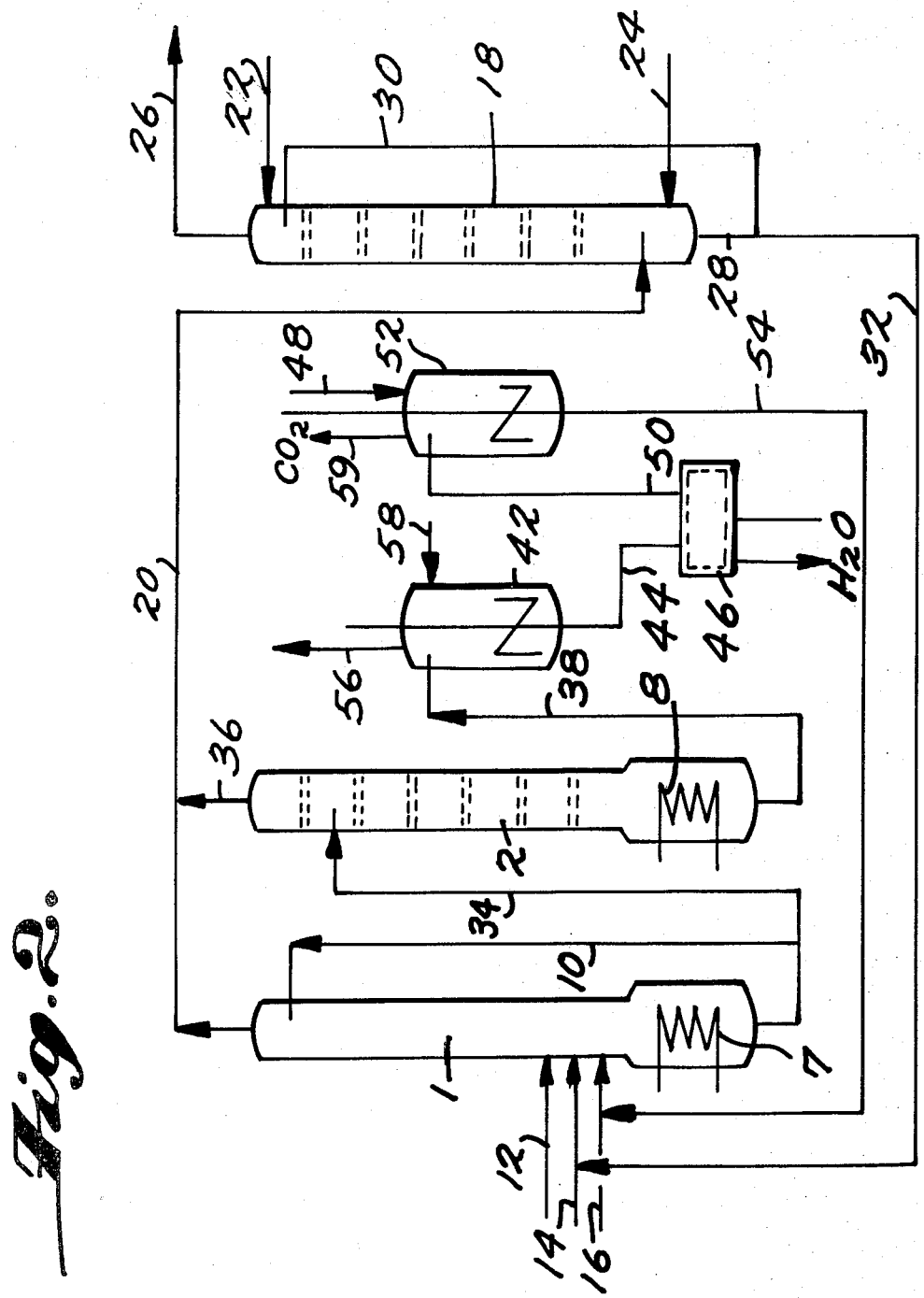

FIGS. 1, 2 and 3 of the drawings are schematic diagrams illustrating three different ways of carrying out the process continuously.

In the drawings like numbers refer to like parts.

The process will be further explained in connection with the following examples.

EXAMPLE 1

In a 250 ml. round bottomed flask equipped with stirrer, thermometer, reflux condenser and a feed immersion tube, there were dissolved in 100.0 grams of water, 17.0 grams of $CuCl_2.2H_2O$ (0.1 mole) and 27.0 grams of $FeCl_3.6H_2O$ (0.1 mole) and there were added with vigorous stirring 24.3 ml. of hydrocyanic acid and 50 ml. of concentrated hydrochloric acid. Inside of one hour there were now added 100 grams of 15% aqueous hydrogen peroxide and the temperature allowed to rise from 35° C. to 65° C. The optimum reaction temperature was at 65° C. The crude gas contained by gas chromatographic analysis:

| | Percent |
|---|---|
| Cyanogen chloride | 64 |
| Dicyanogen | 2 |
| Oxygen | 10 |
| Hydrogen cyanide | 24 |

Considering the recycling of the hydrogen cyanide the cyanogen chloride amounted to a yield of 95% of theory with a throughput yield of 71%, both calculated on the amount of hydrocyanic acid added.

EXAMPLE 2

In the apparatus described in example 1, there were placed 17.0 grams (0.1 mole) of $CuCl_2.2H_2O$ dissolved in 50.0 grams and 50.0 ml. (0.5 mole) of concentrated hydrochloric acid added.

With strong stirring there were then added 16.2 ml. (equal to 10.8 grams) of liquid hydrocyanic acid and 40.8 ml. (equal to 13.8 grams of 100%) of 30% aqueous hydrogen peroxide solution within an hour. At 65° C. cyanogen chloride was very quickly generated. The resulting product had the following composition by chromatographic analysis:

| | Percent |
|---|---|
| Cyanogen chloride | 83 |
| Hydrogen cyanide | 5 |
| Oxygen | 12 |

Since no dicyanogen is formed and the hydrogen cyanide can be recycled, there is obtained a yield of almost 100% of theory and a throughput yield of 94.4%, both calculated on the hydrocyanic acid added.

EXAMPLE 3

In the apparatus described in example 1, which was further provided with an inlet tube for chlorine gas, there were dissolved in 100 ml. of water, 17.0 grams (0.1 mole) of $CuCl_2.2H_2O$ and 27.0 grams (0.1 mole) of $FeCl_3.6H_2O$.

According to the following equation:

$$HCN + \tfrac{1}{2}Cl_2 + \tfrac{1}{2}H_2O_2 \rightarrow ClCN + H_2O$$

there were added with strong stirring 40.5 ml. (equal to 27.0 grams or 1.0 mole) of liquid hydrocyanic acid and 51 ml. of 30% (equal to 17.0 grams of 100% or 0.5 mole) of aqueous hydrogen peroxide, as well as 36.0 grams (0.5 mole) of chlorine gas within 90 minutes while the reaction temperature was held at 65° C. The crude gas had the following analysis by gas chromatography:

| | Percent |
|---|---|
| Cyanogen chloride | 93 |
| Dicyanogen | 1.0 |
| Oxygen | 5.0 |
| Hydrogen cyanide | 1.0 |

The amount of the condensed crude gases amounted to 60.1 grams which corresponds to a yield of 90.9% of theory of cyanogen chloride.

EXAMPLE 4

There were added to the apparatus described in example 3, 17.0 grams (0.1 mole) of $CuCl_2.2H_2O$ dissolved in 100 ml. of water and 50 ml. of concentrated hydrochloric acid. Under strong stirring there were then added 40.5 ml. (equal to 27.0 grams or 1.0 mole) of liquid hydrocyanic acid and 51 ml. of 30% (equal to 17.0 grams of 100% or 0.5 mole) aqueous hydrogen peroxide solution, as well as 36.0 grams (0.5 mole) of chlorine gas within 90 minutes while the reaction temperature was held at 65° C.

The crude gas had the following composition by gas chromatographic analysis:

| | Percent |
|---|---|
| Cyanogen chloride | 94 |
| Hydrogen cyanide | 4.0 |
| Oxygen | 2.0 |

There were obtained 60.8 grams of condensed crude gas which corresponds to a yield of cyanogen chloride of 93.0% of theory based on the hydrogen cyanide added.

In the continuous carrying out of the process of the invention it is propitious to remove from the cycle the water brought in with the hydrogen peroxide and the hydrochloric acid as well as that formed in the reaction.

This can be provided for first by distilling off of the catalyst solution introduced into the cycle and the catalyst solution is thereby again concentrated to its initial value.

Besides it is also possible after removal of the cyanogen chloride from the reaction mixture to separate the cupric or ferric ions from the waste water by precipitation with alkali or alkaline earth carbonates (e.g. sodium carbonate, potassium carbonate, calcium carbonate, magnesium carbonate) as basic copper or iron carbonate and to dissolve the precipitate with mineral acids, e.g. hydrochloric acid, hydrobromic acid, sulfuric acid and nitric acid. The dissolved salt is then returned to the cycle. Especially suitable for the precipitation is calcium carbonate. The preferred acids are hydrochloric acid and sulfuric acid. The corresponding cupric or ferric salts are then, as stated, again returned to the inserted catalyst solution.

Instead of direct reaction of hydrogen cyanide and hydrogen peroxide with hydrochloric acid, it is also possible to form the hydrochloric acid in the reaction solution itself by reaction of chlorine with hydrogen cyanide.

According to equation I $$HCN + Cl_2 \rightarrow ClCN + HCl$$

cyanogen chloride and hydrochloric acid are formed whereupon the hydrochloric acid after removal of the cyanogen chloride in the usual manner is reacted with hydrogen peroxide according to equation II $$HCl + HCN + H_2O_2 \rightarrow ClCN + 2H_2O.$$

The reaction takes place according to equation III, that is according to the sum of equations I and II.

$$2HCN + Cl_2 + H_2O_2 \rightarrow 2ClCN + 2H_2O,$$

by dividing in half III corresponds to $$HCN + \tfrac{1}{2}Cl_2 + \tfrac{1}{2}H_2O_2 \rightarrow ClCN + H_2O.$$

The advantage of operating in the manner just described is that the hydrochloric acid formed according to equation I cannot attain a high concentration in the reaction solution because it is immediately reacted off and thereby the saponification of the hydrogen cyanide is reduced to a minimum.

EXAMPLE 5

In the apparatus of FIG. 1 which operated in a continuous manner, a solution of 400 grams of $CuSO_4 \cdot 5H_2O$ (1.6 moles) and 72.2 grams of $FeSO_4 \cdot 7H_2O$ (0.26 mole) in 40 kg. of water in reactor 1 by quick mixing by means of a pump (not shown) was led into the cycle over conduit 10.

Acording to the following equation:

$$HCl + HCN + H_2O_2 \rightarrow ClCN + 2H_2O$$

approximately equimolar amounts of hydrogen peroxide, hydrochloric and hydrocyanic acid were introduced from the side into the reaction solution through conduits 12, 14 and 16. The reaction temperature was held to about 50° C. by cooling with the help of heat exchanger 5. From the top of the reactor 1 the crude cyanogen chloride gas reached washing column 18 over conduit 20. In the washing column the cyanogen chloride was freed of an about 2% hydrocyanic acid constituent by counter current washing with chlorine containing water (by introduction of water over conduit 22 and chlorine over conduit 24). The cyanogen chloride gas leaving the washing column by conduit 26 still contains about 5 weight percent of oxygen and carbon dioxide. The chlorine containing chiefly hydrochloric acid containing water leaves column 18 at the bottom through conduit 28 and 95% is returned as wash water by way of conduit 30 into column 18 while the remainder is led back into reactor 1 by way of conduit 32 with fresh hydrochloric acid from conduit 14. These additions are caused by the trifling decomposition of the hydrogen peroxide and the oxidative saponification of hydrocyanic acid.

To continuously eliminate the water brought in with the hydrogen peroxide solution and the aqueous hydrochloric acid and formed during the reaction (see the equation) the reaction solution is led by way of conduit 34 into the distillation column 2 which was heated by heat exchanger 6. The reaction solution was freed here from the dissolved cyanogen chloride and still unreacted hydrocyanic acid. The off gas passes to conduit 36 which discharges into conduit 20 and then to the washing column 18. By distilling off water, the steam passes by way of conduit 38 into the condenser 4, the catalyst solution was concentrated. The concentrated catalyst solution was again returned by way of conduit 40 to the reactor 1. In this apparatus (reactor 1) per hour there were reacted 0.932 kg. of hydrocyanic acid (34.6 moles) with 4.075 kg. of 31% aqueous hydrochloric acid (34.6 moles) and 3.735 kg. of 35% aqueous hydrogen peroxide solution (38.45 moles) to form 1.915 kg. of cyanogen chloride, i.e. about 90% of theory (2.13 kg.) calculated on the HCN.

Per hours about 6–7 kg. of water were distilled off via conduit 38.

EXAMPLE 6

In the apparatus of FIG. 2 which operated in a continuous manner, a solution of 273 grams of $CuCl_2 \cdot 2H_2O$ (1.6 moles) and 70.2 grams of $FeCl_3 \cdot 6H_2O$ (0.26 mole) in 40 kg. of water in reactor 1 by quick mixing by means of a pump (not shown) was led into the cycle. Approximately equimolar amounts (see the equation in example 5) of hydrocyanic acid, hydrogen peroxide and hydrochloric acid were introduced from the side into the reaction solution through conduits 12, 14 and 16. The reaction temperature was held to about 50° C. by cooling with the help of heat exchanger 7. The crude cyanogen chloride escaping from the top of the reactor 1 was freed from the unreacted hydrocyanic acid in washing column 18 as in example 1. The gas composition was the same as in example 5. To eliminate the water brought in with the hydrochloric acid and hydrogen peroxide in the reaction solution and the water of reaction per hour 6–7 liters of the catalyst solution were led into the stripping column 2 (which was provided with heat exchanger 8) via conduit 34. The catalyst solution was freed from the cyanogen chloride and unreacted hydrocyanic acid in column 2. The off gases from the top of stripping column 2 via conduit 36 which discharged into conduit 20 were led to washing column 18 and treated there as in example 5. The stripped catalyst solution passed via conduit 38 into container 42 (provided with a stirrer) where it was collected and treated with an equimolar amount of calcium carbonate (based on the total of cupric chloride and ferric chloride) from conduit 58. The precipitation of the dissolved salts tok place here as the basic copper and iron carbonates and the formed carbon dioxide escaped via conduit 56. The salts were led by way of conduit 44 into the centrifuge 46 and there separated from waste water and arrived via conduit 50 into container 52 (likewise equipped with a stirrer) for dissolution with hydrochloric acid. From this container the solution was returned to the reactor 1 via conduit 54. The hydrochloric acid (2.5 moles of 31% HCl per mole of combined copper and iron carbonates) was introduced into container 52 via conduit 48 and the carbon dioxide formed in container 52 escaped via conduit 56a. The chlorine containing, chiefly hydrochloric acid containing water was drawn off likewise via conduit 28 as in example 5 and employed again as in example 5.

In this apparatus per hour there were reacted 0.932 kg. of hydrocyanic acid (34.6 moles) with 4.075 kg. of 31% aqueous hydrochloric acid (34.6 moles) and 3.735 kg. of 35% hydrogen peroxide solution (38.45 moles) to form 1.915 kg. of cyanogen chloride, i.e. about 90% of theory (2.13 kg.) calculated on the HCN.

EXAMPLE 7

In the apparatus of FIG. 3 which operated in a continuous manner, a solution of 400 grams of $$CuSO_4 \cdot 5H_2O$$

(1.6 moles) and 72.2 grams of $FeSO_4 \cdot 7H_2O$ (0.26 mole) in 40 kg. of water in reactor 1 by quick mixing by means of a pump (not shown) was led into the cycle.

According to equation III the corresponding amounts of hydrocyanic acid, chlorine gas and hydrogen peroxide (the latter in slight excess) were introduced into the reaction solution. The hydrocyanic acid and hydrogen peroxide were introduced to reactor 1 through conduits 12 and 14 as in examples 5 and 6. The main amount of the chlorine necessary for the reaction passes via conduits 60 and 62 into the upper part of the washing column 18 and reacts with the hydrogen cyanide dissolved in the reaction solution according to equation I.

The hydrochloric acid formed according to equation I enters the reactor 1 where it reacts with hydrogen cyanide and hydrogen peroxide according to equation II to form cyanogen chloride. The hydrogen cyanide present with this cyanogen chloride after being separated from the catalyst solution in stripping column 2 via conduit 64, enters washing column 18 where again with the chlorine it forms hydrochloric acid according to equation I. In this manner the cycle is closed.

Conduit 72, container 66 and conduit 68 only serve the purpose of removal of the residual hydrocyanic acid (about 2%) from the departing cyanogen chloride gas by introduction of the residual chlorine (2% of the total chlorine) into the head of washing column 18 where it reacts with the hydrocyanic acid to form cyanogen chloride. A portion (50%) of the catalyst solution also goes via conduit 70 to container 66.

The reaction temperature in reactor 1 is held at about 50° C. To eliminate the water brought in with the hydrogen peroxide and that formed in the reaction per hour about 2 liters of catalyst solution from reactor 1 were led into the stripping column 2 where it was freed of dissolved cyanogen chloride and unreacted hydrocyanic acid as in example 5. 50% of the catalyst solution was recycled via conduit 10 and the balance as stated above went via conduit 70 to container 66. The off gas from the top of stripping column 2 was led via conduit 64 to washing column 18. The stripped catalyst solution for recovery of copper and iron salts and the separation of water was further processed as in example 6 but adding sulfuric acid rather than hydrochloric acid. The calcium sulfate formed was removed in centrifuge 46 and the $CuSO_4$ and $FeSO_4$ returned via conduit 74 to the reactor 1.

In this apparatus per hour there were reacted 0.932 kg. of hydrocyanic acid (34.6 moles) with 1.23 kg. of chlorine gas (17.3 moles) and 1.87 kg. of 35% hydrogen peroxide (19.25 moles) to form 1.96 kg. of cyanogen chloride, i.e. about 92% of theory (2.13 kg.) calculated on the HCN employed.

What is claimed is:

1. A process for the production of cyanogen chloride consisting essentially of reacting (1) hydrogen cyanide with (2) aqueous hydrochloric acid and (3) hydrogen peroxide in the presence of either (a) a water soluble cupric salt as a catalyst in an amount of at least 0.05 mole per liter of solution or (b) a water soluble cupric salt in an amount of at least 0.05 mole per liter of solution together with a water soluble ferric salt as an activator in an amount of at least 0.05 mole per liter of solution.

2. A process according to claim 1 wherein the water soluble ferric salt is present as an activator.

3. A process according to claim 1 wherein the hydrochloric acid is a 3 to 36 weight percent aqueous solution of hydrochloric acid.

4. A process according to claim 3 wherein the hydrogen cyanide is added either in gaeous or liquid form.

5. A process according to claim 4 wherein the hydrogen peroxide is added as a 35 weight percent aqueous solution.

6. A process according to claim 4 wherein the cupric salt is cupric chloride.

7. A process according to claim 6 wherein ferric chloride is also added as a promoter.

8. A process according to claim 1 wherein the cupric salt is selected from the group consisting of cupric chloride, cupric cyanide, cupric nitrate, cupric bromide and cupric sulfate.

9. A process according to claim 1 wherein the cupric salt is the salt of an inorganic acid.

10. A process according to claim 9 including a ferric salt of the same inorganic acid as the cupric salt.

11. A process according to claim 1 wherein the cupric salt solution is first mixed with a portion of the hydrochloric acid and then the other reactants are added and finally the remainder of the hydrochloric acid is added.

12. A process according to claim 1 wherein (1), (2) and (3) are used in equimolar amounts.

13. A process according to claim 1 which is carried out continuously.

14. A process according to claim 13 wherein a water soluble ferric salt is also added as an activator.

15. A process according to claim 13 wherein the cyanogen chloride containing reaction solution after removal of cyanogen chloride is freed of cupric salt by precipitation with alkali metal or alkaline earth metal carbonate, the precipitated cupric carbonate is treated with aqueous strong mineral acid to form water soluble cupric salt catalyst solution and the catalyst solution is returned to the reactor for producing cyanogen chloride.

16. A process according to claim 15 wherein a water soluble ferric salt is also added and the cyanogen chloride containing reaction solution after removal of cyanogen chloride is freed of ferric salt by precipitation with said alkali metal or alkaline earth metal carbonate, the precipitated ferric carbonate is treated with said aqueous strong mineral acid to form water soluble ferric salt in said catalyst solution.

17. A process according to claim 16 wherein the catalyst solution after removal of cyanogen chloride is heated to remove a portion of water present by distillation and the concentrated catalyst solution is returned to the reaction step.

18. A process according to claim 17 wherein half of the hydrogen cyanide is reacted first directly with chlorine to form cyanogen chloride and hydrogen chloride and then the remainder of the hydrogen cyanide is reacted with the hydrogen chloride thus formed and the hydrogen peroxide to form further cyanogen chloride.

19. A process according to claim 13 wherein half of the hydrogen cyanide is reacted first directly with chlorine to form cyanogen chloride and hydrogen chloride and then the remainder of the hydrogen cyanide is reacted with the hydrogen chloride thus formed and the hydrogen peroxide to form further cyanogen chloride.

20. A process according to claim 1 wherein the mole ratios of hydrogen chloride to hydrogen cyanide to hydrogen peroxide are 0.9 to 1.1 moles of hydrogen chloride, 0.9 to 1.1 moles of hydrogen cyanide and 0.9 to 1.1 moles of hydrogen peroxide.

References Cited

UNITED STATES PATENTS

| 999,215 | 8/1911 | Foersterling | 75—105 |
|---|---|---|---|
| 2,865,708 | 12/1958 | Dinsmore et al. | 75—108 X |

FOREIGN PATENTS

| 1,173,882 | 7/1964 | Germany. |
|---|---|---|

OTHER REFERENCES

Schumb et al., "Hydrogen Peroxide," 1955, pp. 565–566.

Williams, "Cyanogen Compounds," 2nd ed., 1948, pp. 5–9.

"Chemical Abstracts," vol. 18, p. 795 (1924).

Groggins, "Unit Processes In Organic Synthesis," 5th ed., 1958, pp. 507–517.

MILTON WEISSMAN, Primary Examiner

U.S. Cl. X.R.

423—42, 140